United States Patent [19]

Grandine, II

[11] 4,203,848

[45] May 20, 1980

[54] PROCESSES OF MAKING A POROUS MEMBRANE MATERIAL FROM POLYVINYLIDENE FLUORIDE, AND PRODUCTS

[75] Inventor: Joseph D. Grandine, II, Acton, Mass.

[73] Assignee: Millipore Corporation, Bedford, Mass.

[21] Appl. No.: 800,574

[22] Filed: May 25, 1977

[51] Int. Cl.² .................................................. B29D 27/04
[52] U.S. Cl. .............................. 210/490; 210/500 M; 264/38; 264/41; 264/216
[58] Field of Search .................... 264/41, 49, 331, 180, 264/38, 216; 260/2.5 M, 29.2 TN, 30.8 DS; 210/500 M, 490

[56] References Cited

U.S. PATENT DOCUMENTS

| | | | |
|---|---|---|---|
| 1,421,341 | 6/1922 | Zsigmondy . | |
| 1,713,289 | 5/1929 | Landucci . | |
| 2,037,292 | 4/1936 | Weihe ................................... | 264/180 |
| 2,242,372 | 5/1941 | Schneider . | |
| 2,245,429 | 6/1941 | Carver et al. . | |
| 2,282,009 | 5/1942 | Talbot . | |
| 2,301,368 | 11/1942 | Carver . | |
| 2,383,047 | 8/1945 | Dreyfus . | |
| 2,418,211 | 4/1947 | Williams . | |
| 2,783,894 | 3/1957 | Lovell et al. . | |
| 2,824,816 | 2/1958 | Somerville et al. . | |
| 2,884,387 | 4/1959 | Bleber et al. . | |
| 2,997,448 | 8/1961 | Hochberg . | |
| 3,000,757 | 9/1961 | Johnston et al. . | |
| 3,067,482 | 12/1962 | Hollowell . | |
| 3,100,721 | 8/1963 | Holden . | |
| 3,129,159 | 4/1964 | Maier et al. . | |
| 3,190,765 | 6/1965 | Yuan . | |
| 3,208,875 | 9/1965 | Holden ................... | 260/29.2 TN X |
| 3,211,687 | 10/1965 | Chapron ....................... | 260/30.8 DS |
| 3,216,882 | 11/1965 | Feldt et al. ........................ | 264/41 X |
| 3,348,963 | 10/1967 | Fukushima et al. . | |
| 3,376,370 | 4/1968 | Koblitz et al. . | |
| 3,406,096 | 10/1968 | Rodgers . | |
| 3,412,184 | 11/1968 | Sharples et al. ................... | 264/41 X |
| 3,427,179 | 2/1969 | Merten . | |
| 3,429,957 | 2/1969 | Merten . | |
| 3,432,584 | 3/1969 | Cannon et al. .................... | 264/41 X |
| 3,432,585 | 3/1969 | Watson . | |
| 3,439,074 | 4/1969 | Sharples et al. . | |
| 3,449,153 | 6/1969 | Saligny et al. . | |
| 3,450,650 | 6/1969 | Murata . | |
| 3,484,273 | 12/1969 | Kawase et al. . | |
| 3,507,683 | 4/1970 | Parsons . | |
| 3,540,916 | 11/1970 | Fukada et al. . | |
| 3,551,244 | 12/1970 | Forester . | |
| 3,567,809 | 3/1971 | Ueno et al. . | |
| 3,567,810 | 3/1971 | Baker . | |
| 3,620,895 | 11/1971 | Bailey et al. .................. | 260/2.5 M X |
| 3,642,668 | 2/1972 | Bailey et al. ..................... | 264/331 X |
| 3,696,180 | 10/1972 | Cunningham et al. . | |
| 3,703,570 | 11/1972 | Busch . | |
| 3,744,642 | 2/1973 | Scala . | |
| 3,767,737 | 10/1973 | Lundstrom . | |
| 3,810,814 | 5/1974 | Herrick . | |
| 3,876,738 | 4/1975 | Marinaccio et al. ......... | 264/DIG. 62 |
| 4,032,309 | 6/1977 | Salemme ............................ | 264/41 X |

FOREIGN PATENT DOCUMENTS 2217375 4/1972 Fed. Rep. of Germany .
2427394 6/1974 Fed. Rep. of Germany .

OTHER PUBLICATIONS

Elford, William J. "Ultrafiltration", in *J. Roy. Micr. Soc.*, 48, 36–45 (1928) 12/21/27.

Elford, William J. "Ultra-Filtration Methods and Their Application in Bacteriological and Pathological Studies", in *Br. Jr. Exp. Pathology*, 126–143 (1929).

Elford, William J. "Structure in Very Permeable Collodion Gel Films and Its Significance in Filtration Problems," In *Proc. Roy. Soc. B*, 106, 216–229 (1930).

Elford, William J. "New Series of Graded Collodion Membranes Suitable for General Bacteriology Use, Especially in Filtration Virus Studies," in *J. Path. & Bact.* 34, 505–521 (1931).

J. Biol. Chem., 58, 305–319 (1923–1924); Collodion Membranes of High Permeability, by J. M. Nelson and David P. Morgan, Jr.

J. Biol. Chem., 75, 795–815 (1927); Nitrocellulose Membranes of Graded Permeability, by H. F. Pierce.

U.S. Office of Saline Water, "Fabrication and Evaluation of New Ultrathin Reverse Osmosis Membranes" by P. S. Francis, Washington, D.C., U.S. Department of Interior (Research and Development Progress Report No. 177).

Elford, William J. "The Principles of Ultrafiltration as Applied in Biological Studies," in *Proc. Roy. Soc.* 112, 384–406 (1933).

*Primary Examiner*—Philip Anderson
*Attorney, Agent, or Firm*—Irons and Sears

[57] ABSTRACT

Covers processes for making microporous membranes and molecular filtration membranes from vinylidene fluoride polymers, and the products so produced. A continuous version of the process consists of applying a layer of a solution of a polyvinylidene fluoride polymer to a rigidly supported surface of a backing belt to form a film, then passing the belt through a formation bath, in which the membrane is formed. To form the polymer solution, the polymer is dissolved in a liquid vehicle that will dissolve up to about 25% by weight of the polymer at a temperature of at least 50° C. but that dissolves substantially less of the polymer at about 20° C. (room temperature). The polymer solution is formed at 50° C. or higher, and the formation bath is maintained at about room temperature. The formation bath is a mixture of the liquid vehicle solvent with a second liquid that is miscible with the solvent but that is not itself a solvent for the polymer. The film is maintained immersed in the formation bath until it has been converted to a porous membrane whose pore structure is essentially fully formed, by leaching of the solvent from the film and its replacement with the non-solvent liquid. Thereafter the residual solvent is extracted from the porous membrane, and after separation of the membrane from the backing belt, the membrane is dried. The preferred solvent - non-solvent system for the formation bath is acetone-water. A preferred formation bath composition is from about 70% to about 80% acetone by volume.

21 Claims, 1 Drawing Figure

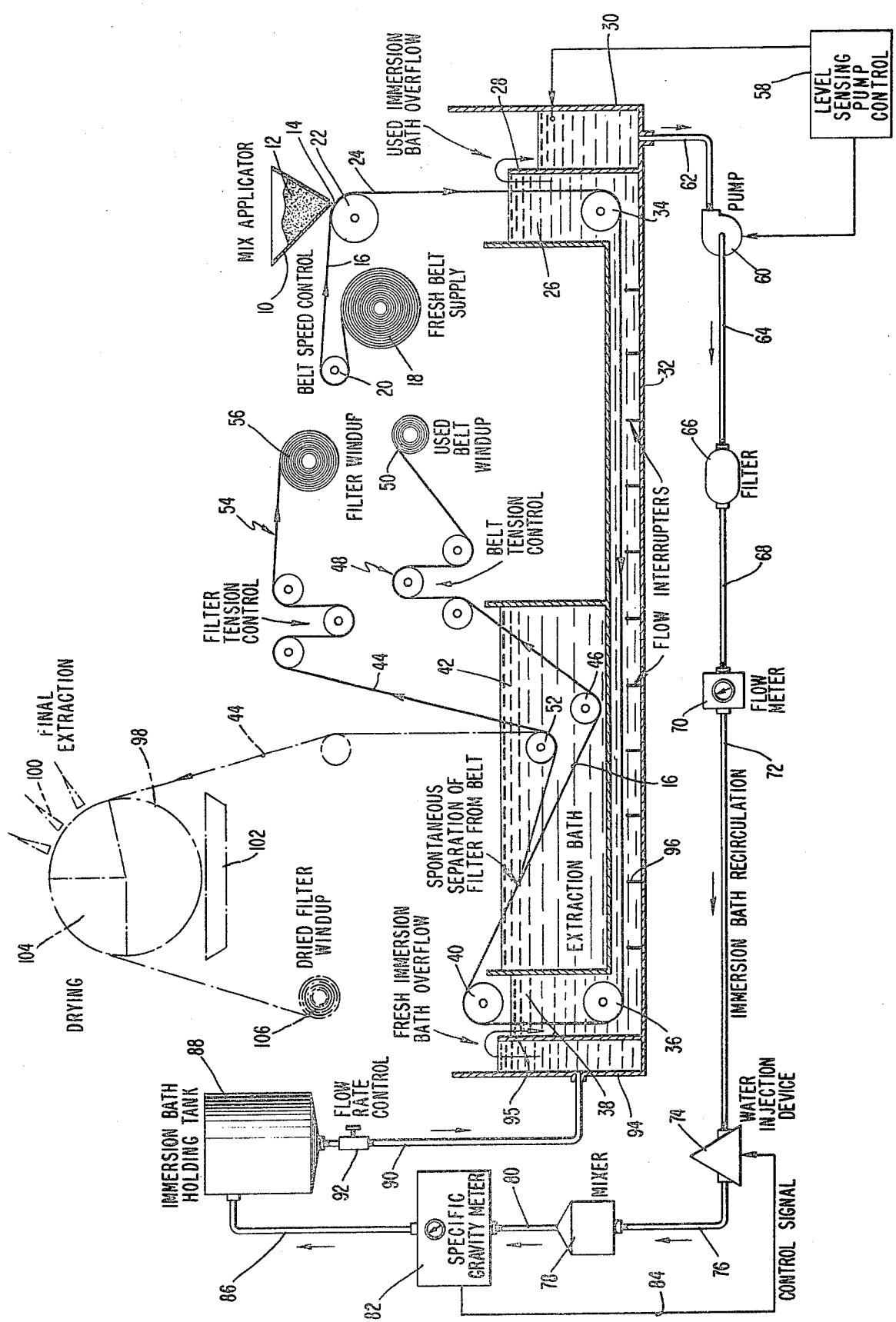

PROCESSES OF MAKING A POROUS MEMBRANE MATERIAL FROM POLYVINYLIDENE FLUORIDE, AND PRODUCTS

FIELD OF THE INVENTION

This invention relates to a process for making a porous membrane from a polyvinylidene fluoride polymer. In particular, the invention relates to a continuous process that offers a practical means for the production of microporous membranes and skinned molecular filtration membranes from polyvinylidene fluoride polymers.

BACKGROUND

A microporous membrane filter is a thin sheet, generally formed from a synthetic plastic material, having a substantially uniform, continuous matrix structure containing millions of capillary pores. The pore diameters tend to be very uniform, within narrow limits.

A microporous membrane filter functions as an absolute screen or sieve. It retains on its surface all particles larger than the pore diameter. Many smaller particles will pass through the filter, but some particles, whose size approximately equals the pore diameter, may become trapped in the matrix. The net result of such entrapment may be that, if enough pores are blocked, the filter becomes plugged in an irreversible manner, and the flow rate declines.

Such microporous membrane filters are available with average pore sizes in the range from about 25 nanometers (0.025 micrometers or 250 Angstrom units) up to a preferred maximum size of about 14 micrometers. The term "microporous membrane" is not well defined in the art, however, and the upper limit pore size is considered by some to extend to about 20–25 micrometers. Under most circumstances, such filters will not retain even the largest of macromolecules. They are therefore not recommended for the technique known as "molecular filtration". However, the smallest of these pore sizes will retain viruses and significant fractions of many large macromolecules, and are therefore suitable for a limited number of certain molecular filtration applications.

Techniques for making microporous membrane filters can be found in each of the following U.S. Pat. Nos. 3,100,721; 3,208,875; 3,642,648 and 3,876,738. Thus, U.S. Pat. No. 3,100,721 describes a technique for making an unsupported microporous film, from any one of a wide spectrum of polymers, including, among others: nylons, polyesters, vinyl polymers and copolymers, and the like. The process involves coating a polymeric dispersion onto an expendible cellophane sheet, treating the coating with water, then drying the coating and stripping it from the cellophane sheet. This disclosure is incidental to the primary concern of the patent, which is the production of synthetic leather. The later, very similar U.S. Pat. No. 3,208,875, is also concerned primarily with the production of synthetic leather, and the production of a microporous film is incidental. The typical microporous stratum, for a synthetic leather product, has a porosity of from about 10% to about 20% by volume of the stratum.

U.S. Pat. No. 3,642,668 is concerned with the production of a particular kind of porous film for use in unique distillation equipment. The production technique described specifically is the usual hand production technique where a vinylidene fluoride polymer solution is coated on a glass plate, which is then immersed in a leaching bath. However, the patent speculates, beginning at column 5, line 67, that the polymer solution can be cast onto a rotating drum or belt, or even extruded directly into the leaching bath through a slotted extrusion die that is moved, relative to the bath, at a speed relative to the rate of extrusion. To be suitable for the intended purpose, the product is a microporous membrane having a pore volume of at least 50% by volume, and a majority of the pores have diameters in the range from 0.5 micrometers to 2.0 micrometers.

In U.S. Pat. No. 3,876,736, the polymer solution is cast directly under the surface of the leaching bath, so that it is not exposed to the atmosphere.

Attempts to produce microporous membrane filters having pore sizes in the true molecular size range, which is from about 10 Angstrom units up to about 100 Angstrom units, have generally led to problems or very slow flow and rapid plugging. Such pore sizes make molecular filtration possible, and generally have been achieved by the use of "skinned" membranes.

Skinned membranes differ in design and in performance from the microporous membrane filters discussed above. Such membranes have been known and understood at least since the publications by Loeb and Sourirajan, "Sea Water Demineralization By Means of a Semi-Permeable Membrane", U.C.L.A. Dept. of Engineering Report 60—60, 1960, and also, "Sea Water Demineralization By Means of An Osmotic Membrane", Advances in Chemistry Series, Vol. 38, 1962, pp. 117 et seq. Such membranes are now regarded as the filters best suited for retaining a wide range of macromolecules while maintaining high flow rates.

A skinned membrane consists of a thin polymeric film or skin that is supported on and integral with a highly porous substrate. The substrate contributes strength and durability to the filter, but the thin skin is the actual molecular filtration membrane, and it is placed on the upstream side, facing the fluid to be filtered. The skin layer is densely structured to be able to retain molecules, but it is very thin, typically less than two micrometers. Because it is so thin, its resistance to flow is minimized. Since the skin is backed by a very open, porous substrate layer, flow rates through the membrane are high. Retained molecules and particles are held at the surface of the membrane, on its skin, and do not enter into the porous structure. Skinned membranes therefore seldom become plugged.

A microporous membrane filter is generally given an absolute pore size rating, and it will retain all particles larger than that pore diameter. However, a skinned membrane, at least in its skin portion, does not have discrete pores that can be measured accurately. Skinned molecular filters retain most molecules above a nominal or approximate limit, as well as some fraction of smaller molecules. They do not retain all molecules larger than an absolute cutoff size. Since some dissolved macromolecules apparently deform or are forced through the skin, and because of the complicated character of the skin, only nominal limits are appropriate, to characterize membranes of this kind. Since molecular weight is an approximate guide to molecular size, it is convenient to characterize molecular filters by their percent retention of selected solutes having accurately known molecular weights. From such data, a membrane can be assigned a nominal molecular weight limit. It represents the molecular weight at and above which most species are retained by that membrane. This limit is most reliable as a guide with respect to relatively globular molecules.

A typical process for the production of a skinned molecular filter, sometimes called a reverse osmosis membrane, is described in U.S. Pat. No. 3,412,184. That process involves casting a solution of a cellulose ester as a thin film, evaporating a portion of the casting solvent, leaching with an organic solvent, optionally immersing in a hot water bath to subject the film to a heating step, and then recovering the product membrane. The production technique is essentially a manual technique. In Example 1, it is suggested that the cast film be leached in methanol, and then transferred successively into solutions of methanol and water having weight ratios of 80:20, 60:40, and 20:80 parts, respectively, and then into a bath of essentially pure water. The heating step, in the water bath, was for the purpose of developing desalination characteristics.

A more advanced, continuous process for the production of cellulose ester membranes is described in U.S. Pat. No. 3,792,135. This process involves the following steps, in the order stated:
(1) coating a film of a "dope" of a cellulose ester on a web;
(2) permitting solvent to evaporate into the atmosphere, to cause incipient formation of a skin or "active" layer; and
(3) immersing the film in a hot aqueous bath, to gel the film in the form of an asymmetric membrane.

A more recent U.S. Pat. No. 3,988,245, describes a skinned membrane made of a polyvinyl formal resin and cast on a cloth backing and a solvent—non-solvent process for making it. This patent illustrates the typical scanning electron microscope cross-section, at 10,000 times enlargement, for such a membrane. That cross-section is characterized by somewhat tubular pore walls that extend transversely of the membrane, that is, in a direction generally perpendicular to the skin. In FIG. 1 of the patent, these tubular, somewhat cylindrical walls extend between the skin, on one face of the membrane, and a cloth backing, on the other face of the membrane.

The manual processes that have been used in the past for producing small quantities of either microporous membranes or skinned molecular filtration membranes, generally on what amounts to a custom production basis, have a utilized a solvent selected from among such known strong solvents, for example, as dimethyl formamide, dimethyl sulfoxide, dimethyl acetamide, and the like. These materials are all recognized as having a good solvent action on polyvinylidene fluoride in particular. Unfortunately, these materials are also quite volatile, have undesirable toxicity, and therefore present practical problems in use. These problems arise not only from safety considerations, but also because materials such as dimethyl acetamide have a high affinity for polyvinylidene fluoride, and therefore are rather difficult to remove during the extraction and drying steps that are an essential part of the membrane production process. If any appreciable quantity of such a good solvent material is not fully extracted from the membrane, and an annealing step is employed, the solvent may have a very undesirable effect on the porous membrane structure.

Furthermore, partly because these materials are such good solvents, it tends to be more difficult to recover them for recycling and reuse than is the case with other solvent materials that are in more common industrial use. Furthermore, because of the hazard that they present, a closed system, with attendant expense, would be preferred for their use.

SUMMARY OF THE PRESENT INVENTION

The present invention is a process for forming from a vinylidene fluoride polymer, that is, a polymer of which at least 90% is polyvinylidene fluoride, a porous membrane, either microporous or skinned, having at least 60%, preferably at least 70%, and generally 70% to 80% or even more of its volume taken up by intercommunicating pores of very uniform size. For a microporous membrane, the average pore size is below about 25 micrometers and preferably up to about 14 micrometers.

A particular feature of the process of the invention is the use of a solvent for the polymer, such as acetone, for example, that is an adequate solvent at temperatures above 50° C., up to its boiling point, and that dissolves substantially less of the polymer at room temperature than at elevated temperatures. The formation bath for making the porous membrane, by replacing the solvent with a non-solvent, is then operated at a reduced temperature, preferably about room temperature.

The process is preferably continuous, and in one embodiment thereof, comprises:
(a) applying a layer of a solution of the film-forming polymer in a liquid vehicle that is a solvent for the polymer at an elevated temperature, to a rigidly supported surface of a travelling backing belt to form a film of the solution on the belt;
(b) passing the film-belt composite into a formation bath at about room temperature, that includes a non-solvent for the polymer that is miscible with the liquid vehicle of the polymer solution;
(c) immersing the film-belt composite in the formation bath until the film has been converted to a porous membrane whose pore structure is essentially fully formed, while maintaining the bath at a substantially constant, preselected composition;
(d) separating the membrane from the web;
(e) extracting any residual solvent from the porous membrane, and
(f) drying the membrane.

One of the important advantages of the present invention derives from the use of acetone as the solvent for the polyvinylidene fluoride. Acetone is usually not thought of as a solvent for this particular polymer, because it is exceedingly difficult to dissolve any appreciable quantity of polyvinylidene fluoride in acetone at room temperature. In order to dissolve a sufficient quantity to form an adequately viscous solution for use in practicing a continuous process in accordance with the present invention, the acetone must be heated close to its boiling point, that is, at least about 50° C. However, acetone is completely compatible with water and a variety of like materials that are not solvents for the polymer but that are useful, just as water is, as an important constituent of the formation bath. When acetone is used in the continuous process of the present invention not only as the solvent for the polymer, but also as an important, often a major constituent of the formation bath, the engineering considerations relating to the process are much simplified. The recovery of the solvent for reuse is relatively easy. To maintain the composition of the formation bath reasonably constant, make up water is added as needed. Perhaps even more importantly, the problems associated with many other solvent materials are eliminated.

There are several other features of the process of this invention that, if used, are advantageous. One such feature is that the polymer solution may be applied, at a substantially constant head, for even dispensing. Another important feature is that of recirculating the liquid of the formation bath, at a substantially constant composition, through the bath in the direction opposite the direction of travel of the film-belt composite.

The invention embraces the products that are produced by the process, as well as the processes that are disclosed and claimed in this application.

Whether the process is batch or continuous, the normally hydrophobic membrane of polyvinylidene fluoride may be converted to be hydrophilic, by immersing the dried membrane in a solution of a water-insoluble surfactant, then drying.

Other important features and advantages of the present invention will be made more apparent from the detailed description of the invention that follows.

BRIEF DESCRIPTION OF THE DRAWING

The single FIGURE of drawing is a schematic diagram showing an arrangement of equipment of use in practicing one preferred embodiment of the invention, and showing in dotted lines a schematic representation in abbreviated form of equipment suitable for use in an alternate, in-line final extraction and drying step in accordance with another preferred embodiment of the invention.

DETAILED DESCRIPTION OF THE INVENTION

Referring now in detail to the drawing by numerals of reference, the numeral 10 denotes generally equipment that can be used in a continuous process in accordance with one preferred embodiment of this invention. This equipment includes a knife box 10 for holding a supply of a polymer solution 12. The knife box 10 is provided with a doctor knife 14, for applying a film of the polymer solution at a substantially uniform thickness onto a belt 16 of polyester or other suitable material, that is caused to travel from a supply roll 18, over a belt speed control roll 20, thence over a support roll 22 that is disposed beneath the doctor knife 14. The support roll 22 offers rigid support for the belt as it travels beneath the doctor knife 14 and the film of polymer solution is applied to it.

The film of polymer solution that is applied to the belt 16 forms with that web a film-belt composite 24 that is caused to travel in a substantially vertical direction into a formation bath 26. This formation bath is maintained in a tank of a generally U-shape, having a right upright wall 28 that is formed to permit a continuous overflow of the formation bath into a receiver 30.

The formation bath is also formed with a long, shallow base section 32. A pair of idler rolls 34, 36 respectively are mounted at each end of this elongate base section, to guide and to apply tension to the film-belt composite as it travels through this section of the formation bath. The left upright portion 38 of the formation bath has another idler roll 40 disposed at its upper end, over which the film-belt composite is trained, and from which it travels into an extraction bath 42. While the function of the formation bath is to convert the film to a fully formed porous membrane, the function of the extraction bath is to effect removal of the polymer solvent from the porous membrane.

The belt 16 is easily parted from the formed membrane 44 in the extraction bath, and the used belt is passed under an idler roll 46, over web tension control rolls 48, and thence onto a take-up roll 50. The take-up roll 50 is driven, and draws the belt through the process. The membrane 44 is similarly passed under an idler roll 52, and thence over a series of membrane tension control rolls 54, to a driven windup roll 56.

The formation bath is equipped for continuous recirculation and for maintenance of substantially constant composition at the liquid inlet end of the bath. To these ends, an instrument (not shown) is mounted in the overflow receiver 30, to sense the level of liquid in the receiver. This instrument is connected to a control mechanism 58, for turning on and off a pump 60, as needed. The receiver 30 is connected through a line 62 to the pump 60, which is mounted to discharge through a line 64, through a filter 66, a line 68, and a flow meter 70, thence through a line 72 to an injection device 74 for the non-solvent liquid, which in its simplest form may be a tee that connects to a non-solvent liquid supply line (not shown). Since water is a preferred non-solvent liquid, the drawing refers to the device 74 as a water injection device. However, other non-solvent liquids can be used, such as for example, the lower alkanols. A line 76 connects the injection device 74 to a mixer 78, that mixes the liquids for the formation bath, to insure that they are of substantially uniform composition at this point. The mixer is connected by a line 80 to a specific gravity meter 82, for monitoring the composition of the liquid. A feedback loop 84 is provided, tp permit the meter 82 to operate the non-solvent liquid injection device 74 as appropriate.

The meter 82 is connected through a line 86 to a holding tank 88, from which the formation bath liquid may flow through a line 90, that is equipped with a flow rate control valve 92, into an overflow tank 94, in which fresh liquid for the formation bath is stored, eventually to be fed into the formation bath by flowing over a dam 95 into the left leg 38 of the formation bath.

The base section 32 of the formation bath is desirably equipped with flow interrupters 96, to minimize lamellar flow of the liquid in the formation bath. These flow interrupters, in accordance with one preferred embodiment of the invention, are sheets of stainless steel that are mounted to extend transversely of the formation bath tank, inclined at 90° to the tank bottom so as to prevent lamellar flow and to cause circulatory currents to be generated at intervals along the path of travel of the film-belt composite.

In operation, the polymer solution is applied to the polyester belt 16 at the doctor knife 14. The solution contains first liquid that is a solvent for the polymer and that is miscible with the liquid formation bath. The formation bath is a mixture that includes a portion of the first liquid and, as well, a portion, often a minor portion, of a second liquid that is miscible with the first liquid but that is not a solvent for the polymer. The film-belt composite remains immersed in the formation bath until the porous structure is fully formed. The composite then travels into the extraction bath, where much of the solvent for the polymer, that may remain in the porous membrane, is displaced. The wet membrane is separated from the backing belt, and both the membrane and the belt are wound up. The wet membrane can then be dried later in any convenient fashion.

In one preferred embodiment of the invention, the first liquid is a solvent material such as acetone, and the second liquid is water. The formation bath is an acetone-water blend, and the extraction bath is water.

In operation of the recirculatory system for the formation bath, an output signal from the specific gravity meter 82 is used to control the water injection device 74. This device may be a relay-operated solenoid valve (not shown) that turns the flow of makeup water on and off. During the on portion of each cycle, the flow rate is controlled by the water supply pressure and by a throttling needle valve (not shown) that is connected in series with the solenoid valve. The water injection device 74 also includes a shutoff valve and a check valve (not shown) that are located between the solenoid valve and the point of water injection, to prevent backflow and other associated problems. The controlled flow of water is supplied through the line 76, along with recirculating bath liquid, to the mixer 78, which mixes these liquids and supplies the mixed makeup fluid through the line 80 to the specific gravity meter 82, and thence through the line 86 to a holding tank 88.

This arrangement causes the specific gravity meter 82 to oscillate about a set value, with the mean value constant within a very narrow range during a casting run.

The rate of recirculation must be selected to balance several factors. First, the formation of waves, at the point where the film-belt composite 24 enters the formation bath, should be avoided. In part, this can be accomplished by maintaining the speed of entry into the bath of the film-belt composite 24 above a minimum value of about 5 cm./sec., and by the physical design of the overflow discharge for the bath, but the rate of recirculation is also a factor. A second consideration in this regard is that the composition of the formation bath at the discharge point is important and generally, the change in composition from one end of the formation bath to the other should not exceed about 10%.

In accordance with an alternative embodiment of the invention, equipment is provided for in-line extraction and drying. In practice, and as a practical matter, several drums would be required, to insure complete extraction and drying. For illustrative purposes only, however, only a single drum is shown in the drawing. The principle of operation is the same. As shown in dotted lines in the drawing, the membrane 44, after separation from the backing web, may travel over a hollow drum 98. This drum may be provided, in known fashion, with suction means (not shown) within the drum, to apply suction to the surface of the membrane 44 that engages against the surface of the drum. An alternative to the use of suction is the use of a foraminous blanket (not shown) to overlie the membrane, to hold it in place on the surface of the drum in the same fashion as suction would do. The basic purpose is to constrain the membrane against shrinkage and movement, and of course a combination of a restraining blanket and suction, or other means, can be used. A series of spray heads 100 may be disposed along one arcuate segment of the drum, to apply extraction liquid to the membrane, to displace the solvent remaining in the membrane. When suction is used, all or a part of the sprayed liquid is drawn directly through the membrane into the drum by the applied suction, and any liquid that drips down may be caught in the tray 102.

In a final area 104 of the drum, heat is applied to the membrane. This may be accomplished by heating the drum, by blowing hot air on the membrane, or by a combination of these and/or other steps. The dried membrane is then wound on a windup roll 106. In practice, as many as three or more vacuum drums may be used, in series, to complete drying of the membrane, preferably with progressively warmer temperatures being applied to the membrane as it approaches dryness.

The final drying stage preferably involves a heat treatment or "annealing" step. Such a step involves heating the membrane above its expected temperature of use, to insure that the membrane is dimensionally stable when used. This is a very important step from the practical standpoint. For sterilizing-grade polyvinylidene fluoride membrances, the operating temperature may be in the range from about 100° C. to about 125° C. Since the polymer has a melting point of about 150° C., a good annealing temperature is about 135° C.

One preferred embodiment of the present invention is in a continuous production process, and the selection of materials for use in the process is important from the practical standpoint, particularly with respect to environmental considerations and safety. The following several examples describe the production of polyvinylidene fluoride membranes, which are chemically inert, essentially biologically inert, and have good mechanical properties. Such membranes therefore have great promise and potential for use in the pharmaceutical and food processing industries, where the ability to accomplish cold sterilization by filtration through a membrane, and to sterilize a filter in place, are important considerations, as is inertness to the materials that are being processed.

Past attempts to make polyvinylidene fluoride membranes have generally involved the use of solvent materials that are quite volatile, that have undesirable toxicity, and that therefore present practical problems in use. These problems arise not only from safety considerations, but also because such materials have had a high affinity for the polyvinylidene fluoride, and therefore have been difficult to remove during the extraction and drying steps.

The preferred solvent material, acetone, is ordinarily not regarded as a good solvent for the polyvinylidene fluoride. In fact, acetone is only practical for use at temperatures very close to its boiling point, and at concentrations of polyvinylidene fluoride up to a practical maximum, from the standpoint from ease of handling, of about 22% to 25% of the polymer by weight of the solution. At temperatures much below about 50° C., it is difficult to get enough polyvinylidene fluoride in the solution for practical purposes. Once the polymer is in solution, however, it remains in solution even though the temperature drops below 50° C. This is convenient since the solution is ordinarily cast at about room temperature. While acetone is the preferred material for the present process, other solvent materials can, of course, be used, with appropriate precautions as to safety and to effect complete removal from the membrane after is is formed.

Similarly, while water is the preferred non-solvent for use in the formation bath, because of its economy, ease of use, and the resulting overall simplicity of the system, other non-solvents can be used, such as methanol, ethanol, Freon, and, if odor is not a problem, butanol, provided, of course, that the non-solvent liquid selected is miscible with the solvent used.

The invention will now be described further by means of several specific demonstrations of preferred embodiments of the invention, in the following examples. All parts and percentages are by weight unless otherwise specified, and temperatures are in degrees Celsius unless otherwise specified.

EXAMPLE 1

Polyvinylidene Fluoride Microporous Membrane Production

In this demonstration of the invention, the polymer employed was a polyvinylidene fluoride polymer, sold under the trademark "Kynar" by Pennsylvania Salt Manufacturing Company, Philadelphia, and identified by the manufacturer by the designation Kynar 600, a powder, and Kynar 601, which is the same polymer in the form of pellets. This grade was originally introduced as Kynar RC 9192 (a research control number). Both the powdered form and the pelleted form can be and have been used. The polymer is triboelectric, however, so that it is inconvenient to use in powdered form, without enclosed automatic metering and dispensing equipment.

This grade of polyvinylidene fluoride was developed as a new melt-processable grade, particularly designed for high speed extrusion. It has good thermal stability, chemical resistance, and corrosion resistance. Its melting point is about 145° C.–155° C. Melt viscosity is reported by the manufacturer to be 25,000 poises at about 232° C. (450° F.). This product is a homopolymer containing 59% fluorine by weight.

The polymer in pellet form (Kynar 601) was made up into a solution at 17.72% concentration by weight of polymer in acetone at 55° C. Some stirring was necessary to expedite dissolution.

A disposable belt immersion casting machine was used, having a configuration essentially that shown in the single figure of the drawing, with the wet finished membrane being taken up on a windup roll. The polymer solution was applied as a thin, uniform film by doctor knife application to a polyester belt that was drawn beneath the doctor knife at a constant speed of about 9.98 cm./sec. The casting solution and the casting belt were both at about room temperature.

The polyester belt was trained over a back-up roll so that at casting, it presented a rigidly supported surface, to insure uniformity of deposition thickness. Almost immediately after deposition of the film on the backing web, and with less than 10 seconds exposure to the atmosphere, the film-belt composite was introduced into one leg of the formation bath. The film-belt composite was then caused to travel through the bath, remaining immersed to permit substantially complete formation of the porous structure of the membrane. The film-belt composite was held under tension while immersed, between the end rollers 34 and 36. The formation bath tank was about 7.1 meters long. The 96 flow interrupters are in the form of eleven upright strips of stainless steel disposed transversely of the formation bath. They were so disposed as not to engage in direct physical contact with the film-belt composite during its travel through the formation bath.

The composition of the formation bath, as delivered through the input line 90, was 78.96% acetone by volume, the balance being water. Since acetone was being replaced in the film as it traveled through the formation bath, the bath liquid grew progressively richer in acetone as it travelled from the bath liquid inlet end to the bath liquid outlet end (adjacent to the entry point into the bath of the film-belt composite). The formation bath liquid was continuously recirculated during operation.

The film-belt composite was drawn from the formation bath directly into the aqueous extraction bath, which was essentially just water. Residual acetone was displaced by water in the extraction bath. The polyester belt separated easily from the membrane in this bath, and both were taken up on windup rolls. The membrane was later dried on a separate piece of equipment (not shown on the drawing).

The dried microporous membrane had a thickness of 83 microns, and a porosity of 72% of its volume. The rate of water flow through the finished membrane, under 15 psi pressure, was 42 cm.$^3$/cm.$^2$/min., abbreviated hereafter as cm./min. The weight of a 47 mm. diameter disc was 74.15 mg. The methanol bubble point was 12.8 psi.

The properties reported were measured on several discs, each 47 mm. in diameter, cut from the membrane. The reported values are average values. Thus, the weight reported is the average weight of such 47 mm. diameter discs, and the thickness is the average as measured on several discs. Similarly, the water flow rates and methanol bubble points were measured on such discs. From these measured properties, plus the bulk density of the polymer, the porosity was computed.

The process as described above generally results in substantially complete membrane formation within about 45 seconds from initial immersion time, for a filter thickness of about 120 micrometers or less. The time required of course affects the casting speed and/or the size of the formation bath. Formation time is also related to the thickness of the membrane as cast.

Additional demonstrations of the invention were made, with variations in some of the parameters such as initial polymer concentration in the polymer solution, maximum solution temperature, belt speed, and the amount of acetone in the formation bath. The results of several generally successful demonstrations are reported below. In a few of these demonstrations of the invention, operable membranes were produced, but lateral striations made meaningful thickness measurements impossible. While the cause of the formation of these striations is not completely clear, it is believed that contributing factors included uneven pressure on the polymer solution as it was being deposited on the polyester belt, lack of uniformity of web speed, and wave occurrence in the formation bath. The values reported in each case are the average values of several 47 mm. discs, cut from the membrane produced in a particular production run.

Table 1

| Summary of Membrane Forming Demonstrations | | | | | | | | |
|---|---|---|---|---|---|---|---|---|
| Mix Parameters | | Cast Parameters | | Average Membrane Properties | | | | |
| | | | | | | | H$_2$O | |
| PVF2 (%) | Max. Temp. (°C.) | Belt Speed (cm/sec) | Bath (% Acetone) | Weight (mg.) | Thickness ($\mu$m) | Porosity (%) | Flow (cm/min) | MeOH B.P. (psi) |
| 17.72 | 55.0 | 9.98 | 79.14 | 78.51 | 90 | 71 | 40.9 | 15 |
| 17.72 | 55 | 9.98 | 78.96 | 95.25 | | | 10.9 | 20 |

Table 1-continued
Summary of Membrane Forming Demonstrations

| Mix Parameters | | Cast Parameters | | Average Membrane Properties | | | | |
|---|---|---|---|---|---|---|---|---|
| PVF2 (%) | Max. Temp. (°C.) | Belt Speed (cm/sec) | Bath (% Acetone) | Weight (mg.) | Thickness (μm) | Porosity (%) | H₂O Flow (cm/min) | MeOH B.P. (psi) |
| 17.72 | 55.0 | 9.98 | 79.14 | 82.72 | 80 | 66 | 32.5 | 16 |
| 17.72 | 55.0 | 9.98 | 79.14 | 78.97 | | | 44.2 | 13 |
| 17.73 | 54.2 | 15.21 | 78.84 | 76.04 | 77 | 67 | 49 | 14 |
| 17.73 | 54.2 | 15.21 | 79.24 | 80.84 | 91 | 70 | 58.5 | 14.3 |
| 17.73 | 54.2 | 15.21 | 78.84 | 92.89 | | | 19.3 | 17 |
| 17.73 | 54.2 | 15.21 | 79.24 | 91.62 | 101 | 70 | 42.5 | 16 |
| 19.32 | 53 | 5.86 | 80.0 | 53.96 | 112 | 84 | 9 | 28 |
| 19.32 | 53 | 15.24 | 80.18 | 58.51 | 117 | 83 | 9.11 | 30 |
| 19.32 | 53 | 12.70 | 80.3 | 70.82 | 74 | 68 | 1.89 | 48 |
| 19.32 | 53 | 10.16 | 80.37 | 75.02 | 77 | 68 | 1.61 | 48 |
| 19.32 | 53 | 12.7 | 80.3 | 57.4 | 114 | 83 | 8.7 | 30 |
| 19.32 | 53 | 12.7 | 80.3 | 72.85 | 70 | 67 | 2.8 | 45 |
| 19.32 | 53 | 12.70 | 80.3 | 62.65 | 135 | 85 | 6.5 | 33 |
| 19.12 | 55 | 10.19 | 78.07 | 59.22 | 74 | 74 | 39 | 15 |
| 19.12 | 55 | 15.3 | 78.2 | 62.83 | 75 | 72 | 33.2 | 16 |
| 19.12 | 55 | 12.55 | 78.36 | 65.57 | 82 | 74 | 49.8 | 16 |
| 17.7 | 54.8 | 10.1 | 76.18 | 78.85 | 92 | 72 | 37.4 | 15 |
| 17.7 | 54.8 | 15.1 | 76.36 | 97.27 | 97 | 70 | 29.2 | 18 |
| 17.7 | 54.8 | 12.7 | 76.5 | 90.18 | 101 | 70 | 35.2 | 17 |
| 15.92 | 51 | 10.28 | 76.07 | 69.61 | | | 22.4 | 22 |
| 15.92 | 51 | 15.3 | 76.28 | 74.60 | | | 18.8 | 19 |
| 15.92 | 51 | 12.6 | 76.47 | 80.58 | | | 16 | 19 |
| 15.95 | 55 | 10.0 | 76.15 | 74.15 | | | 62.8 | 10 |
| 15.95 | 55 | 12.8 | 76.45 | 86.43 | 95 | 70 | 56.6 | 11 |
| 15.98 | 53.3 | 12.6 | 79.94 | 78.8 | | | 12.3 | 19 |
| 15.98 | 53.3 | 12.7 | 80.29 | 77.86 | 111 | 77 | 51.5 | 13 |
| 17.70 | 53 | 10.1 | 79.93 | 80.41 | | | 24.1 | 16 |
| 17.70 | 53 | 15.4 | 80.05 | 77.45 | 123 | 79 | 25.2 | 17 |
| 17.70 | 53 | 12.81 | 80.15 | 83.55 | 133 | 79 | 19.1 | 17 |
| 17.77 | 55 | 10.14 | 78.15 | 62.25 | 76 | 73 | 70.2 | 12 |
| 17.77 | 55 | 15.3 | 78.28 | 67.83 | 80 | 73 | 56.8 | 13 |
| 17.77 | 55 | 12.8 | 78.38 | 69.96 | 82 | 72 | 56.5 | 14 |
| 17.77 | 55 | 12.8 | 78.42 | 75.85 | 78 | 68 | 39.5 | 15 |
| 17.77 | 55 | 12.8 | 78.5 | 72.75 | 78 | 69 | 53.4 | 15 |
| 17.77 | 55 | 12.8 | 78.59 | 83.42 | 87 | 68 | 37.4 | 17 |
| 19.03 | 53 | 10.2 | 80.12 | 74.22 | 122 | 80 | 17.6 | 20 |
| 19.03 | 53 | 15.5 | 80.28 | 79.8 | 129 | 80 | 15.8 | 21 |
| 19.03 | 53 | 12.7 | 80.30 | 78.91 | 127 | 79 | 15.6 | 21 |
| 19.03 | 53 | 12.7 | 80.34 | 82.95 | 121 | 77 | 14.4 | 25 |
| 16.03 | 53 | 10.22 | 75.99 | 60.53 | | | 65.6 | 10 |
| 16.03 | 53 | 15.51 | 76.21 | 63.72 | | | 56.5 | 12 |
| 16.03 | 53 | 13.4 | 76.32 | 61.65 | | | 63.4 | 12 |
| 16.03 | 53 | 13.4 | 76.54 | 61.11 | | | 59.5 | 10 |
| 17.572 | 51.2 | 10.1 | 76 | 55.77 | | | 26.7 | 18 |
| 17.572 | 51.2 | 15.1 | 76 | 54.92 | 91 | 80 | 28.3 | 18 |
| 17.572 | 51.2 | 12.56 | 76.00 | 56.28 | 95 | 81 | 29.1 | 19 |
| 17.572 | 51.2 | 12.56 | 76.0 | 59.95 | 99 | 80 | 26.1 | 21 |
| 17.96 | 51.15 | 12.7 | 76 | 125.88 | | | 5.02 | 23 |
| 18.695 | 52.1 | 12.7 | 75.95 | 95.04 | 152 | 79 | 11.6 | 22 |
| 18.695 | 52.1 | 12.7 | 75.95 | 87.99 | 137 | 79 | 13.6 | 22 |

In the foregoing demonstrations, the four parameters whose effects were observed were (1) the concentration of polymer in the initial solution which was in the range from about 16% to about 19% polymer by weight in acetone; (2) the maximum temperature of the polymer solution, which was generally the temperature at which the polymer pellets and hot acetone were mixed to form the solution, and fell into the range from about 51° C. to about 55° C., the solution thereafter tending to fall off in the temperature gradually while being held in the knife box; (3) the speed of entry of the film-belt composite into the formation bath, which was in the range from about 10 cm./sec. to about 15 cm./sec.; and (4) the composition at the inlet to the formation bath tank of recirculating bath liquid, which was in the range from about 76% to about 80% acetone, by volume.

The data reported in the table reflect many more variables than the four above, making the data difficult to interpret in any simple manner. However, the relationship between the thickness and water flow rate on the one hand, and the methanol bubble point on the other hand, would be expected to be linear for a uniform filter morphology, differing only in pore size, and the data confirm that this kind of relationship does seem to exist.

Generally the ranges mentioned above represent proven, preferred operating ranges for the acetone-water-polyvinylidene fluoride (PVF$_2$) system. However, the process is operable over broader ranges than these preferred ranges. Thus the concentration of PVF$_2$ in hot acetone may be from just enough to permit casting a continuous film of adequate thickness, which is about 15%, up to the highest concentration that can be handled in practical fashion, which is about 22% to 25%, depending on the polymer characteristics such as molecular weight. A lower viscosity limit of about 6 poises, as measured on the solution at its makeup temperature, seems to be a practical lower limit, but much higher values can be used. A maximum dissolution temperature of about 56° C. is the practical upper limit for acetone (representing its boiling point) unless a pressurized system is used that permits a higher temperature to be attained.

For reasons that are not fully understood but that are believed to be associated with higher molecular weight and perhaps with greater crystallinity, some difficulty was encountered during one attempt to place another grade of PVF$_2$, Kynar 800, in solution in acetone. It is believed that the difficulty encountered could be overcome by the use of a pressurized system that would permit the use of a higher temperature.

The speed of entry into the formation bath is important with respect to control of waves at the surface of the bath. Waves seem to cause surface irregularities and are to be avoided. At slow entry speeds, wave formation apparently is instigated. At speeds of about 5 cm./sec. or higher, wave formation apparently does not occur. Much higher speeds than 15 cm./sec. can be used without generating undesirable waves. Speed of entry does not appear to be a limiting factor on the rate of speed at which the membrane can be produced, except on the low side.

Formation bath composition for the system acetone-water-PVF$_2$ is preferably in the range from about 65% to about 85% acetone by volume. Higher and lower levels can be used, however. When the bath contains about 90% acetone by volume, membrane formation is very slow. As the acetone concentration is dropped and the water content is increased, there is an increasing tendency for skin formation to occur. The formation bath composition controls the rate at which the polymer separates out of solution to form the porous membrane structure desired. Skin formation, of course, is caused by very rapid separation, in reaction to a high concentration of water (non-solvent). The strength of the membrane is also affected by the rate at which the membrane is formed.

The formation bath temperature is ambient, i.e., room temperature. The use or higher temperature, or the inclusion of use in the formation bath of better solvents than acetone, would tend to slow up membrane formation.

In Table 1, the membrane produced at 15.92% PVF$_2$, 51° C., and with an entry (belt) speed of 10.28 cm./sec. was considered to have particularly desirable properties from the standpoint of potential commercial applications in the chemical and pharmaceutical industries.

EXAMPLE 2

Membrane Production with the use of a Heated Drum Drying Procedure

Other demonstrations of the production of microporous membranes in accordance with the invention were made following the kind of production process illustrated in the single FIGURE of drawing, but utilizing a heated drum for the drying step. The data from selected runs are reported in Table 2 below. As before, the property values reported are average values, based on measurements made on 47 mm. discs cut from the membrane produced in a particular production run.

The process steps were similar to those of Example 1, and the PVF$_2$ was Kynar 601, the pellet form of the polymer, but the aqueous extraction bath was maintained at 40° C. or higher, and air-heated drum drying was used, with the drum temperatures at about 40° C.

Table 2

Membrane Production With Hot Water Extraction And Warm Drum Drying

| Mix Parameters | | Cast Parameters | | Average Membrane Properties | | | | | |
|---|---|---|---|---|---|---|---|---|---|
| PVF2 (%) | Max. Temp. (°C.) | Belt Speed (cm/sec) | Bath % Acetone | Weight (mg.) | Thickness (μm) | Porosity (%) | H$_2$O Flow (cm/min) | Normalized Flow (cm/min) | MeOH B.P. (psi) |
| 19.32 | 53 | 5.86 | 80.00 | 53.96 | 112 | 84 | 9 | | 28 |
| 19.32 | 53 | 15.24 | 80.18 | 58.51 | 117 | 83 | 9.11 | | 30 |
| 19.12 | 55 | 10.19 | 78.07 | 59.22 | 74 | 74 | 39 | | 15 |
| 19.12 | 55 | 15.3 | 78.20 | 62.83 | 75 | 72 | 33.2 | | 16 |
| 19.12 | 55 | 12.55 | 78.36 | 65.57 | 82 | 74 | 49.8 | | 16 |
| 17.7 | 54.8 | 10.1 | 76.18 | 78.85 | 92 | 72 | 37.4 | 34.2 | 15 |
| 17.7 | 54.8 | 15.1 | 76.36 | 97.27 | 97 | 70 | 29.2 | 28.2 | 18 |
| 17.7 | 54.8 | 12.7 | 76.5 | 90.18 | 101 | 70 | 35.2 | 35.6 | 17 |
| 15.92 | 51 | 10.28 | 76.07 | 69.61 | | | 22.4 | | 22 |
| 15.92 | 51 | 15.3 | 76.28 | 74.60 | | | 18.8 | | 19 |
| 15.92 | 51 | 12.6 | 76.47 | 80.58 | | | 16 | | 19 |
| 15.95 | 55 | 10.2 | 76.15 | 74.15 | | | 62.8 | | 10 |
| 15.95 | 55 | 12.8 | 76.45 | 86.43 | 95 | 70 | 56.6 | 53.7 | 11 |
| 15.98 | 53.3 | 12.7 | 80.29 | 77.86 | 111 | 77 | 51.5 | | 13 |
| 17.7 | 53 | 10.1 | 79.93 | 80.41 | | | 24.1 | | 16 |
| 17.7 | 53 | 15.4 | 80.05 | 77.45 | 123 | 79 | 25.2 | 31 | 17 |
| 17.70 | 53 | 12.81 | 80.15 | 83.55 | 133 | 79 | 19.1 | 25.4 | 17 |
| 17.77 | 55 | 10.14 | 78.15 | 62.25 | 76 | 73 | 70.2 | 52.9 | 12 |
| 17.77 | 55 | 15.3 | 78.28 | 67.83 | 80 | 73 | 56.8 | 45.5 | 13 |
| 17.77 | 55 | 12.8 | 78.38 | 69.96 | 82 | 72 | 56.5 | 46.2 | 14 |
| 19.03 | 53 | 10.2 | 80.12 | 74.22 | 122 | 80 | 17.6 | 21.5 | 20 |
| 19.03 | 53 | 15.5 | 80.28 | 79.8 | 129 | 80 | 15.8 | 20.5 | 21 |
| 19.03 | 53 | 12.7 | 80.30 | 78.91 | 127 | 79 | 15.6 | 19.3 | 21 |
| 16.03 | 53 | 10.22 | 75.99 | 60.53 | | | 65.6 | | 10 |
| 16.03 | 53 | 15.51 | 76.21 | 63.72 | | | 56.5 | | 12 |
| 16.03 | 53 | 13.4 | 76.32 | 61.65 | | | 63.4 | | 12 |
| 17.572 | 51.2 | 10.1 | 76.00 | 55.77 | | | 26.7 | | 18 |
| 17.572 | 51.2 | 15.1 | 76.00 | 54.92 | 91 | 80 | 28.3 | 25.7 | 18 |
| 17.572 | 51.2 | 12.56 | 76.00 | 56.28 | 95 | 81 | 29.1 | 27.7 | 19 |
| 17.96 | 51.15 | 12.7 | 76.00 | 125.88 | | | 5.02 | | 23 |
| 18.695 | 52.1 | 12.7 | 75.95 | 95.04 | 152 | 79 | 11.6 | 17.6 | 22 |

Table 2-continued
Membrane Production With Hot Water Extraction And Warm Drum Drying

| Mix Parameters | | Cast Parameters | | Average Membrane Properties | | | | | |
|---|---|---|---|---|---|---|---|---|---|
| PVF2 (%) | Max. Temp. (°C.) | Belt Speed (cm/sec) | Bath % Acetone | Weight (mg.) | Thickness (μm) | Porosity (%) | H$_2$O Flow (cm/min) | Normalized Flow (cm/min) | MeOH B.P. (psi) |
| 18.695 | 52.1 | 12.7 | 75.95 | 87.99 | 137 | 79 | 13.6 | 18.7 | 22 |

Dried on 40° C. drums + air.

The data as to thickness for some membranes were again omitted where lateral striations made meaningful measurement difficult. The column for normalized flow reports a calculated figure, which is the rate of water flow through the membrane tested, but calculated to a thickness of 100 micrometers.

DATA INTERPRETATION

From these data, and from the data in Table 1, some qualitative observations may be made. Belt speed is an important variable for controlling filter properties. Belt speed should be fast enough to avoid lateral corrugation due to bath entry effects, and slow enough so that membrane formation is substantially completed in the formation bath, so that when the membrane enters the extraction bath, skin formation is avoided. The formation bath composition appears to have a measurable effect on both bubble point and flow rate, with increasing water content in the formation bath raising the bubble point and lowering the flow rate. The concentration of polymer in the initial polymer solution, and the maximum temperature of the solution prior to casting, appear to have a much greater influence on membrane properties than either the belt speed or the composition of the formation bath. The bubble point can be raised by increasing the concentration of polymer in the casting solution, or by lowering the mixing temperature, apparently.

Specific surface area measurements on samples of membranes produced indicate that membranes produced in accordance with the present invention appear to have a significantly higher specific surface area than membranes produced by conventional commercial production techniques, in which the solvent is driven off in a controlled humidity atmosphere. In some measured samples, the specific surface was 3 to 4 times as great with membranes produced in accordance with the present invention, as in commercial microporous membrane filters formed from mixed cellulose esters by conventional techniques.

For retention of porous structure by the membrane after it leaves the formation bath, it is important that the acetone, or other solvent, be removed uniformly and without heating, to the extent possible, followed by drying under conditions that prevent distortion due to surface tension effects. In this respect, extraction of the acetone by immersion in a heated water bath, at a temperature in the range from about 40° C. to 80° C., is quite effective, with bath immersion times of three minutes or less. Acetone removal by room temperature air blast is not quite so effective or complete, although it is possible to use room temperature air for initial drying, with warmer air for final drying, to some advantage.

When the membrane is dried on a heated drum, the use of a covering fabric blanket, to hold the membrane in place, helps to prevent distortion, and is most effective if the drying is done at about room temperature or only slightly above room temperature.

Especially effective extraction of the acetone is accomplished when water is drawn through the membrane. Even the use of a very small pressure differential, to draw a liquid such as water or methanol through the membrane, results in a very rapid extraction of residual solvent, to the point where very rapid, elevated temperature drying is possible without collapse of the membrane structure.

Drying on heated drums is expected to be very effective, and heated air may be used to speed up the drying process. A supporting blanket or screen, of very fine material, is preferred for use to help prevent distortion during elevated temperature drying. In an optimized continuous process with vacuum-assisted solvent extraction and drying, production speeds as high as 20 ft./min. to 50 ft./min. or higher should be achievable with uniform high quality.

EXAMPLE 3

Additional Microporous Membrane Production Demonstrations

Some representative data from early demonstrations of the production of microporous membranes in accordance with the invention show the effects of differences in some of the production operating parameters.

In Table 3 below, data is reported from operations on an experimental basis. The membranes were successfully produced.

As a result of the experimental demonstrations of membrane production reported below, and other production demonstrations performed at about the same time but not reported here because the data are largely repetitious, it appeared that the effect of initial mixing time of the polymer solution was relatively insignificant, particularly when compared to the effect of solution concentration or maximum mixing temperature.

To evaluate the properties of the membrane products, each membrane was cut into discs of 47 mm. diameter. The thickness value reported is the range of thicknesses for a particular production run, for several specimen discs cut from the product. Similarly, the ranges for the weights and porosities of the disc show the extremes of the ranges for the several discs on which measurements were taken.

Ranges are also reported for several other properties, including the methanol bubble point, the methanol foam point, the water bubble point, the water foam point, the water flow rate under 15 psi, as observed, and the water flow rate as calculated for a membrane thickness of 100 micrometers (reported as "Flow Thickness/100").

Table 3

| RUN NO. | 3-1 | 3-2 | 3-3 (a) | 3-4 (d) | 3-5 (c) | 3-6 | 3-7 | 3-8 | 3-9 |
|---|---|---|---|---|---|---|---|---|---|
| mix % PVF2 | 17.0 | 17.0 | 17.0 | 17.0 | 17.0 | 17.0 | 17.0 | 17.0 | 17.0 |
| Acetone Grade | ACS | ACS | ACS | ACS | ACS | ACS | ACS | ACS | ACS |
| Mixing Temp. (°C.) | 55.2 | 55.2 | 55.2 | 55.2 | 55.2 | 55.2 | 55.2 | 55.2 | 55.2 |
| Mixing Time (hr.) | 2 | 2 | 24 | 48 | 72 | 144 | 148 | 1 | 24.5 |
| Viscosity (cp.) | ... | 1675 | 1700 | 1770 | 1820 | 1865 | ... | 1610 | 1706 |
| Casting Surface | Polyester | Polyester | Polyester | Polyester | Polyester | Polyester | Polyester (e) | Polyester | Polyester |
| Casting Thickness (μm) | 300 | 300 | 300 | 300 | 300 | 300 | 300 | 300 | 300 |
| Casting Temp. (°C.) | 20 | 20 | 20 | 20 | 20 | 20 | 22 | 20 | 20 |
| Atmospheric Approximate Exposure Time (sec.) | 5 | 5 | 5 | 5 | 5 | 5 | 5 | 5 | 5 |
| % Acetone in Bath (vol.) | 80 | 80 | 80 | 80 | 80 | 80 | 80 | 80 | 80 |
| Bath Temp. (°C.) | 20 | 19 | 19 | 21 | 21 | 19 | 19.3 | 20 | 20 |
| Bath Time (sec.) | 600 (a) | 600 | 600 | 600 | 600 | 600 | 1800 | 600 | 600 |
| Extraction Temp. (°C.) | 35 | 59 | 40 | 42 | 45 | 45 | 48 | 58 | 41.5 |
| Extraction Time (min.) | 10 | 10 | 10 | 15 | 15 | 15 | 15–45 | 15 | 15 |
| Drying Temp. (°C.) | (b) | (b) | (b) | (b) | (b) | (b) | (b) | (b) | (b) |
| Drying Time (min.) | 15 | 15 | 15 | 15 | 15 | 15 | 15–25 | 15 | 10 |
| Thickness (μm) | 74–87 | 82–103 | 77–83 | 77–97 | 77–86 | 90–106 | 106–128 | 94–103 | 90–102 |
| Weight of 47 mm. (mg.) | 56.8–68.7 | 56.6–74.2 | 61.6–66.4 | 60.0–65.0 | 60.4–67.1 | 67.5–81.0 | 78.3–83.2 | 70.0–79.9 | 70.6–77.7 |
| Porosity (%) | 74.0–75.8 | 75.2–77.9 | 72.9–74.9 | 74.4–79.1 | 73.9–74.7 | 75.0–76.9 | 76.3–77.7 | 74.8–76.1 | 74.3–75.5 |
| MeOH B.P. (psi.) | 14.5–16.2 | 14.4–16.2 | 15.0–16.0 | 12.4–15.5 | 14.5–16.0 | 15.0–17.2 | 15.2–16.2 | 14.4–16.0 | 15.1–16.1 |
| MeOH F.P. (psi.) | 15.2–16.2 | 14.4–16.5 | 15.5–17.0 | 15.5–16.9 | 16.4–18.0 | 16.4–18.0 | 16.0–17.7 | 15.5–16.0 | 16.0–17.8 |
| H2O B.P. (psi.) | 29–35 | 34–38 | 37–40 | 30–38 | 33–39 | 33–40 | 35–38 | 37–39 | 35–37 |
| H2O F.P. (psi.) | 32–37 | 35–40 | 38–41 | 38–42 | 40–42 | 37–43 | 38–41 | 38–42 | 39–42 |
| H2O Flow (cm/min.) | 27.3–39.5 | 24.4–41.7 | 25.5–34.6 | 25.5–36.1 | 23.2–30.5 | 19.3–29.3 | 22.4–26.2 | 23.3–31.6 | 21.0–29.7 |
| Flow Thickness/100 | 23.5–32.0 | 23.9–35.1 | 20.4–27.0 | 21.2–33.6 | 19.5–24.1 | 20.5–27.8 | 24.2–32.0 | 24.2–30.3 | 20.8–27.3 |

(a) Filter did not release from polyester as it does from glass-peeled off drying plate.
(b) Print dryer setting of 200° C. used from here on for drying.
(c) Used MeOH to release filter from drying plate.
(d) Power lost for 1 hr-peeled off of drying plate.
(e) Web moving about 3.2 cm/sec., stopped in bath, yielding 175 cm. length cut into 5 pieces to extract and dry.

During these and other production runs conducted in a similar way, it was observed that the temperature of the casting surface should be at or above the temperature of the polymer solution at the time of casting, to avoid distillation of the solvent onto the casting surface, with attendant undesirable results. To avoid loss of solvent prior to immersion in the formation bath, with a consequent loss of uniformity and reproducibility, it is preferred to cast with both the polymer solution and the casting surface at or near room temperature, that is, in the range from about 15° C. to about 25° C.

EXAMPLE 4

Production of a Hydrophilic Membrane of Polyvinylidene Fluoride

The membranes made by the processes of Examples 1, 2 and 3 are naturally hydrophobic. It is for that reason, of course, that the bubble point measurements were made with methanol.

For many applications, the membrane must be hydrophilic and completely wettable upon contact with water at 20° C. To make such a membrane, the membrane is immersed in a solution of a substantially water-insoluble surfactant, then dried, so that the surfactant is deposited on the membrane.

To demontrate this aspect of the invention, three different non-ionic surfactants were employed. Each was a block copolymer of polyoxyethylene and polyoxypropylene, of the general formula:

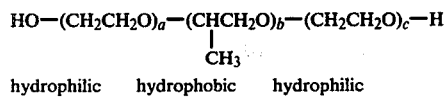

| | | |
|---|---|---|
| hydrophilic | hydrophobic | hydrophilic |

The particular materials used were Pluronic polyols purchased from BASF Wyandotte Corporation of Wyandotte, Michigan, identified as Pluronic polyols grades L101, L121 and L122. The properties of these surfactants are as follows:

Table 4

| Pluronic[R] Grade | Mol. wt. of hydrophobe block (polyoxypropylene) | % of hydrophile (polyoxyethylene) | Average molecular weight | Surface tension of 0.001% water sol. (dynes/cm) |
|---|---|---|---|---|
| L101 | 3250 | 10 | 3800 | 40.7 |
| L121 | 4000 | 10 | 4400 | 35.0 |
| L122 | 4000 | 20 | 5000 | 40.3 |

These particular polyols have very low water-solubility, relatively high molecular weight, and are considered to be very good wetting agents.

Solutions were made up of each of these three types of polyols respectively, at concentrations of 5% each, in methanol. Several PVF2 membrane samples (initially hydrophobic) were then soaked in these solutions, and then dried for 15 minutes at 50° C. After drying, the treated membrane samples were completely water-wettable. It is noted that exposure of the treated membrane to an elevated temperature, such as 135° C., may cause a loss of wettability, except in a case where the high temperature is caused by an environment of superheated steam, in which case there is no apparent loss of wettability.

GENERAL

During operation of the process, the polyester belt is pulled through the system by its takeup roll 50. As it travels through the system, it passes beneath the knife box that is set to a predetermined gap such as, for example, 300 micrometers.

For uniform membrane thickness and the avoidance of surface defects during continuous casting operations, the level of polymer solution in the knife-box should be maintained at a substantially constant level. This may be accomplished manually but preferably is accomplished through the use of any convenient constant level arrangement, such as, for example, equipment that permits the continuous transfer of polymer solution from a holding tank to the knife-box, coupled with the use of a level indicator instrument that controls the rate of flow into the knife-box.

The belt-film composite travels from the knife-box through the atmosphere, with a short exposure time, generally less than 30 seconds and preferably less than 10 seconds. It then passes into the formation bath, which is arranged so that the film does not come into physical contact with rollers, flow interrupters, or the like. With the use of flow interrupters to decrease any tendency toward lamellar flow in the formation bath, and with recirculation of the formation bath and the maintenance at a substantially constant composition, membrane formation takes place very rapidly, generally within 30 seconds or less under good conditions. Good conditions for membrane formation include the use of a solvent material that is a good solvent for the polymer at an elevated temperature and a relatively poor solvent for the polymer at room temperature, and the maintenance of the formation bath at about room temperature, and preferably made up of a mixture of a solvent material with a non-solvent. To produce polyvinylidene fluoride membranes, the preferred system involves the use of acetone at about 50° C. to its boiling point as the solvent, coupled with an appromixately 80% by volume acetone-20% by volume after formation bath, maintained at room temperature, which lead to rapid membrane formation.

When lamellar flow occurs in the formation bath, circulation within the formation bath is decreased, and local concentrations of the solvent material, that is being displaced from the membrane, may occur adjacent the surface of the membrane. When this happens, membrane formation may take longer than 30 seconds, and longer residence time in the formation bath may be required to complete membrane formation.

Belt speed is obviously an important parameter in the process. The belt speed should be fast enough, preferably above about 10 cm./sec., to minimize unevenness of entry of the belt-film composite into the formation bath, but slow enough so that the membrane is completely formed before it leaves the formation bath.

After the membrane has been fully formed, the belt carries it out of the formation bath, still without direct physical contact between the membrane and any solid surface. The membrane readily separates from the belt in the extraction bath, and the used belt is guided to a constant-tension windup. If the physical equipment available permits in-line extraction and drying, it may be done on a continuous basis. However, the wet membrane may be would up for drying in a separate operation, without noticeable deterioration if the storage is only for a reasonable time and if reasonable care is taken so that the wet membrane does not dry out, particularly while still containing solvent material.

Recirculation in the formation bath is accomplished by gravity feed from a holding tank into the end of the formation bath from which the belt leaves, for travel through the formation bath in a direction opposite to the direction of travel of the belt. The rate of recirculation should be such that the formation bath composition reaches an equilibrium at an early point in the operation, consistent with the maintenance of as smooth a surface as possible at the point of entry of the belt-film composite into the formation bath. In addition, during the time equilibrium is being reached, the deviation from the desired bath composition should preferably not be more than about 2% at most, if uniform membrane characteristics are to be achieved. In this respect, steadiness of belt motion, uniformity of belt tracking, unformity of application of the polymer solution to the belt, and effectiveness of the formation bath, are particularly important.

The step of extracting solvent from the fully formed membrane can be accomplished in a variety of ways. Extraction by immersion in a heated water bath, at a temperature in the range from about 40° C. to about 80° C., is quite effective, with bath exposure times of 3 minutes or less. Acetone removal by a room temperature air blast is not quite so effective or complete, although the use of heated air in the final stages of acetone or other solvent removal completes the process in a satisfactory way. A preferred step, either used alone for complete extraction or used in conjunction with a heated water bath, involves the use of a suction device in which water or other displacing liquid is applied to one surface of the membrane and drawn through the membrane by suction, for a complete flushing out and displacement of any residual solvent in the membrane.

While the manner in which the drying is carried out may take a variety of forms, one preferred technique involves the use of one or more vacuum drums, where suction is applied to one surface of the membrane to draw air directly through the membrane for rapid drying. To prevent distortion during drum drying, a fabric blanket may be applied to hold the membrane in place on the surface of the drum. This is particularly effective when drying temperatures are low, in avoiding shrinkage and other distortion of the membrane.

Substantially complete removal of residual solvent during the extraction step is important to avoid collapse of the membrane structure during drying operations, particularly if an elevated drying temperature is employed. When the non-solvent extraction liquid, such as water or methanol, is drawn through the membrane under suction, very rapid and effective extraction of residual solvent takes place, that permits rapid drying operations at an elevated temperature without collapse of the membrane structure. Moreover, when an evacuated, heated drum system is employed for drying such a membrane, from which the solvent material has been completely removed, the vaccum not only tends to draw drying air through the membrane but also holds the membrane on the drum surface, so that even during heated air drying steps, shrinkage may be completely eliminated for a polyvinylidene fluoride membrane even when a temperature up to about 135° C. is employed.

In addition to the extraction techniques previously described, a water spray on the membrane produces excellent results insofar as operability of the process is concerned. While the use of an immersion bath for extraction, or a water spray, appears to facilitate separation of the membrane from the belt, separation can be accomplished without the use of either a bath or a spray, even at relatively high production rates.

The preferred solvent material, for use in the practice of the invention with polyvinylidene fluoride polymers, is acetone. At temperatures above about 50° C., which are relatively close to the boiling point of acetone, the solubility at room temperature is so poor that room temperature acetone is generally not considered to be a solvent for polyvinylidene fluoride. Generally, in the practice of the present invention, the solvent or solvent system for the polymer is preferably one that is a good solvent at a temperature substantially above room temperature, that is, a solvent that will dissolve reasonably readily at least about 15% by weight of the polymer. On the other hand, it is preferred that at room temperature, the material should dissolve substantially less, preferably not more than about 5% by weight of the polymer.

Another reason for preferring acetone, for use as the liquid vehicle for a $PVF_2$ polymer solution, is its excellent miscibility with water. This makes the overall system a simple one that is susceptible to easy control to a constant composition in the formation bath.

Microporous membranes that are produced in accordance with the present invention are particularly useful in the chemical, food, and pharmaceutical industries. In the pharmaceutical industry, in particular, when the maximum pore size of the membrane is in the range from 0.20 micrometers to 0.22 micrometers maximum, the membrane may be used for cold sterilization of fluids being processed through the membrane. The membrane may be steam sterilized in place, repeatedly, when it is made of polyvinylidene fluoride, and in addition, such membranes possess a high degree of chemical inertness that render them useful in the chemical process industries.

Generally speaking, for a sterilizing and repeatedly steam-sterilizable microporous membrane made of polyvinylidene fluoride, desirable physical characteristics will include a thickness on the order of about 100 microns for the finished membrane, within reasonable tolerance limits; a porosity of greater than 60% and preferably greater than 75% of volume, and, in the final product, after treatment to render it hydrophilic, a water bubble point of about 40 psi and a water flow rate under a 15 psi head of more than at 25 cm./min.

In Example 1, several different values were employed for some of the more important operating parameters for the production of microporous membranes. These parameter values have been proven to produce effective microporous membranes by many successful demonstrations. The preferred operating ranges for some of these parameters, for producing microporous membranes, include a polymer concentration in the range from 16% to 19% by weight of the casting solution, formed by dissolving the $PVF_2$ polymer in acetone at a temperature above 50° C., and a formation bath formed from a blend of acetone and water with the acetone concentration being in the range from about 70% by volume to about 80% by volume. The most preferred operating conditions, for the production of membranes for general, cold sterilizing applications, employ the pelleted $PVF_2$, Kynar 601, at a polymer concentration in the range from 17.5% to 18.5% by weight of the casting solution, where the casting solution is made up at a temperature in the range from 52° C. to 53° C. This is used in conjunction with a formation bath formed from an acetone-water blend and containing from 72% to 73% acetone by volume.

The process of the present invention may also be used to produce skinned membranes. Although there are other ways to accomplish this, a preferred technique when the casting solution is a solution of polyvinylidene fluoride in acetone, and the formation bath is a blend of acetone and water, is simply to increase the water content of the bath, for example to about 50% by volume, to increase the rate of reaction between the cast film and the formation bath, and thus to cause formation of the skin on the side of the film that is exposed to the formation bath. Once the skin is formed, there is a much slower diffusion of the water through the skin, to replace the acetone in the film with water from the formation bath. Skinned membranes produced in accordance with the invention are generally useful where such membranes have been used in the past, for example, in removing salt or proteins from dispersions or solutions thereof, for concentrating dilute salt solutions, for processing radioactive waste waters, and the like.

While the invention has been disclosed herein by reference to the details of preferred embodiments thereof, it is to be understood that such disclosure is intended in an illustrative, rather than a limiting sense, and it is contemplated that various modifications in the process and in the product produced by the process of this invention will readily occur to those skilled in the art, within the spirit of the invention and the scope of the appended claims.

What is claimed is:

1. A continuous process for forming a microporous membrane from a polymer that is at least 90% by weight of polyvinylidene fluoride, the membrane having at least 60% of its volume taken up by intercommunicating capillary pores of average size below about 14 micrometers, comprising:
    applying a layer of a solution consisting essentially of the polymer in acetone at a polymer concentration of from about 15% to about 25% by weight of the solution as a thin layer to a rigidly supported surface of a travelling backing belt,
    immersing the belt carrying the layer of polymer solution in a formation bath consisting essentially of a mixture of acetone and water, with the acetone forming from about 55% to about 85% by volume of the bath, the balance being water,
    maintaining the layer immersed in and passing it through an elongate path in the formation bath between the point of entry of the belt and layer into the formation bath and the point of departure of the belt and layer from the bath, to permit replacement of the acetone in the layer with the formation bath liquid, until the layer has been converted to a microporous membrane having an average pore size in the range from about 25 nanometers to about 14 micrometers, wherein the pores intercommunicate, form at least 60% by volume of the membrane, and are of substantially uniform size, and the porous structure is essentially fully formed,
    continuously withdrawing formation bath liquid from the bath adjacent the entry point of the belt into the bath,
    continuously monitoring the composition of the withdrawn formation bath liquid, and adding the necessary amount of water to maintain the liquid at a composition within the specified range of composition for the bath, so that it is recirculable liquid,
    returning the recirculable liquid to the formation bath adjacent the departure point of the belt from the bath,
    separating the formed membrane from the belt,
    washing the membrane with water, apart from the formation bath, to extract any residual acetone or formation bath liquid from the membrane, and then drying the membrane to remove water.

2. The process of claim 1 wherein the layer of polymer solution is applied to the backing belt from a supply reservoir, including the step of maintaining a substantially constant head on the solution in the supply reservoir as it is applied to the belt, to deposit the layer at a uniform thickness.

3. The process of claim 1 wherein the formation bath is a shallow, elongate bath, and including the step of continuously recirculating the formation bath liquid through the bath in a direction opposite to the direction of travel of the belt.

4. The process of claim 1 wherein the polymer concentration in the polymer solution is in the range from about 16% by weight of polymer to about 19% by weight of polymer, and wherein the acetone in the formation bath forms from about 70% to about 80% of the bath by volume.

5. The process of claim 1 wherein the entry speed of the belt carrying the applied layer of polymer solution, into the formation bath, is in excess of about 10 cm./second.

6. A microporous membrane of polyvinylidene fluoride prepared in accordance with claim 1.

7. The process of claim 4 wherein the polymer concentration in the polymer solution is in the range from about 17.5% to about 18.5% by weight of the solution, and wherein the acetone in the formation bath forms from about 72% to about 73% by volume of the bath.

8. A microporous membrane of polyvinylidene fluoride prepared in accordance with the process of claim 4.

9. A continuous process for forming a microporous membrane from a homopolymer of vinylidene fluoride, the membrane having at least 60% of its volume taken up by intercommunicating capillary pores of average size below about 14 micrometers, comprising:

applying a layer of a solution consisting essentially of the polymer in acetone at a polymer concentration of from about 16% to about 19% by weight of the solution as a thin layer to a rigidly supported surface of a travelling backing belt from a supply reservoir, while maintaining a substantially constant head on the solution in the supply reservoir as it is applied, to deposit the layer on the belt at a uniform thickness, immersing the belt carrying the layer of polymer solution in, and carrying it through a shallow, elongate formation bath that consists essentially of a mixture of acetone and water, with the acetone forming from about 70% to about 80% by volume of the bath, the balance being water, maintaining the layer immersed in the formation bath to permit replacement of the acetone in the layer with formation bath liquid, until the layer has been converted to a microporous membrane having an average pore size in the range from about 25 nanometers to about 14 micrometers, wherein the pores intercommunicate, form at least 60% by volume of the membrane, and are of substantially uniform size, and the porous structure is essentially fully formed, continuously withdrawing formation bath liquid from the bath adjacent the entry point of the belt into the bath, continuously monitoring the composition of the withdrawn formation bath liquid and adding the necessary amount of water to maintain the liquid at a composition within the specified range of composition for the bath, so that it is recirculable liquid, returning the recirculable liquid to the formation bath adjacent the departure point of the belt from the bath, separating the formed membrane from the belt, washing the membrane with water apart from the formation bath to extract any residual formation bath liquid from the membrane, and then drying the membrane to remove water.

10. A microporous membrane of polyvinylidene flouride prepared in accordance with the process of claim 9.

11. The process of claim 9 wherein the concentration of polymer in the polymer solution is from about 17.5% to about 18.5% by weight of the solution, and wherein the acetone in the formation bath forms from about 72% to about 73% by volume of the bath.

12. The process of claim 11 wherein the speed of entry of the belt carrying the layer of polymer solution, into the formation bath, is in excess of 10 cm./second.

13. In a process for making either a microporous or an asymmetric membrane that has at least 60% of its volume taken up by pores, from a polymer of vinylidene fluoride, by casting a thin layer of a 15% to 25% by weight solution of the polymer on a substrate, then passing the substrate into a formation bath comprising a liquid that is not a solvent for the polymer but that is miscible with the solvent for the polymer to form a porous membrane, removing the solvent and the nonsolvent from the porous membrane, and drying, the improvement wherein the casting solution is formed by dissolving the polymer in hot acetone above 50° C., and including the steps of:

immersing the cast layer in a formation bath consisting essentially of a mixture of acetone and water, with the acetone forming at least a major portion, up to 80% by volume, of the bath, the balance being water, maintaining the layer immersed in the formation bath until the layer has been converted to a porous membrane whose pore structure is essentially fully formed, separating the porous membrane from its substrate, then washing the membrane with water to remove residual liquid from the membrane.

14. A process in accordance with claim 13 in which the process steps are practised for continuous production of the membrane, and wherein the substrate is a travelling backing belt, including:

passing the immersed layer and belt through an elongate path in the formation bath, between the point of entry of the belt and layer into the formation bath and the point of departure of the belt and layer from the bath, withdrawing formation bath liquid from the bath adjacent the entry point of the belt into the bath, monitoring the composition of the withdrawn formation bath liquid and adding any necessary water to maintain the liquid at a composition within the specified range of composition for the bath so that it is recirculable liquid, then returning the recirculable liquid to the formation bath adjacent the departure point of the belt from the bath.

15. The process of claim 13 for making an asymmetric membrane, wherein the acetone is present in the formation bath at a concentration approaching 50% by volume, sufficient that an essentially asymmetric membrane is formed.

16. The process of claim 14 for making a microporous membrane, wherein the acetone is present in the formation bath at a concentration approaching 80% by volume, sufficient that an essentially microporous membrane is formed.

17. The process of claim 14 wherein the rate of withdrawal of formation bath liquid and the rate of return of the recirculable liquid respectively are such that an equilibrium is established and the deviation from the equilibrium composition is not more than about 2% at most.

18. The process of claim 14 for making a skinned membrane, wherein the water is present in the formation bath at a concentration approaching 50%, by volume, sufficient to cause skin formation.

19. A skinned molecular filtration membrane of a vinylidene fluoride polymer prepared in accordance with the process of claim 18.

20. The process of claim 16 wherein the casting solution has a polymer concentration from 17.5% to 18.5% by weight based on the solution weight, and where the formation bath has a composition of 72% to 73% acetone by volume.

21. A microporous membrane of a vinylidene fluoride polymer prepared in accordance with the process of claim 16.

* * * * *